United States Patent [19]

Pollack et al.

[11] Patent Number: 4,647,076
[45] Date of Patent: Mar. 3, 1987

[54] HIGH PRESSURE FLUID SWIVEL

[75] Inventors: Jack Pollack, Reseda; Tarlochan S. Mann, Northridge, both of Calif.

[73] Assignee: Amtel, Inc., Providence, R.I.

[21] Appl. No.: 787,388

[22] Filed: Oct. 15, 1985

[51] Int. Cl.[4] .............................................. F16L 17/02
[52] U.S. Cl. ..................................... 285/95; 285/111; 285/106; 285/272; 285/351; 285/379; 277/188 A; 277/3; 277/27
[58] Field of Search ...................... 285/95, 96, 98, 111, 285/112, 106, 190, 134, 136, 276, 281, 351, 350, 272, 379, 331, 97; 277/3, 27, 59, 57, 58, 206 R, 205, DIG. 8, 188 A, 188 R

[56] References Cited

U.S. PATENT DOCUMENTS

| | | | |
|---|---|---|---|
| 2,081,040 | 5/1937 | King | 277/188 A |
| 2,366,798 | 1/1945 | Lilly | 285/331 |
| 2,701,146 | 2/1955 | Warren | 285/134 |
| 2,813,729 | 11/1957 | Jackson | 285/270 |
| 3,746,372 | 7/1973 | Hynes et al. | 285/95 |
| 3,889,985 | 6/1975 | Gartmann | 285/95 |
| 3,931,853 | 1/1976 | De Putter | 285/190 |
| 3,944,263 | 3/1976 | Arnold | 285/96 |
| 4,065,159 | 12/1977 | Leroy et al. | 285/190 |
| 4,126,336 | 11/1978 | Ortloff et al. | 285/136 |
| 4,174,127 | 11/1979 | Carn et al. | 285/136 |
| 4,289,336 | 9/1981 | Bajeux | 285/136 |
| 4,306,741 | 12/1981 | Foolen | 285/136 |
| 4,391,298 | 7/1983 | Ortloff | 137/615 |
| 4,441,522 | 4/1984 | Griffin | 137/615 |
| 4,489,953 | 12/1984 | Witt | 277/188 A |
| 4,561,679 | 12/1985 | Choate | 285/276 |
| 4,598,735 | 7/1986 | Pedersen | 285/190 |

FOREIGN PATENT DOCUMENTS

| | | | |
|---|---|---|---|
| 150591 | 8/1985 | European Pat. Off. | 285/190 |
| 154395 | 9/1985 | European Pat. Off. | 285/136 |
| 1297515 | 5/1962 | France | 277/188 R |
| 681857 | 10/1952 | United Kingdom | 285/276 |
| 2131112 | 6/1984 | United Kingdom | 285/97 |
| 2132726 | 7/1984 | United Kingdom | 285/97 |

OTHER PUBLICATIONS

Ghilardi, J. P., Dumazy, C., Morris, S. A.; High-Pressure (HPMP) Swivel Joint; 1985; Offshore Technology Conference (OTC).

Primary Examiner—Cornelius J. Husar
Assistant Examiner—Eric K. Nicholson
Attorney, Agent, or Firm—Freilich, Hornbaker, Rosen & Fernandez

[57] ABSTRACT

A fluid swivel is described, which is especially useful for carrying hydrocarbons at high pressures between stationary and rotating walls of a swivel. The swivel forms a fluid-carrying annular chamber and a pair of gap-like passages lying between the walls and extending from opposite sides of the chamber to the environment, with primary and secondary face seals located along each passage. Each passage includes a portion extending between the seals, the passage portion forming a pair of largely radially-extending wall surfaces, one on the outer wall and one on the inner wall. The radially-extending wall surface on the outer wall faces in a first axial direction, and the outer wall at the secondary seal faces in an opposite axial direction. As a result, if the primary seal should fail, this will not change the axial force on the outer wall. The extrusion gaps at the seals extend in radial directions from the seal, so these gaps do not widen when high pressure is applied to the fluid swivel.

8 Claims, 6 Drawing Figures

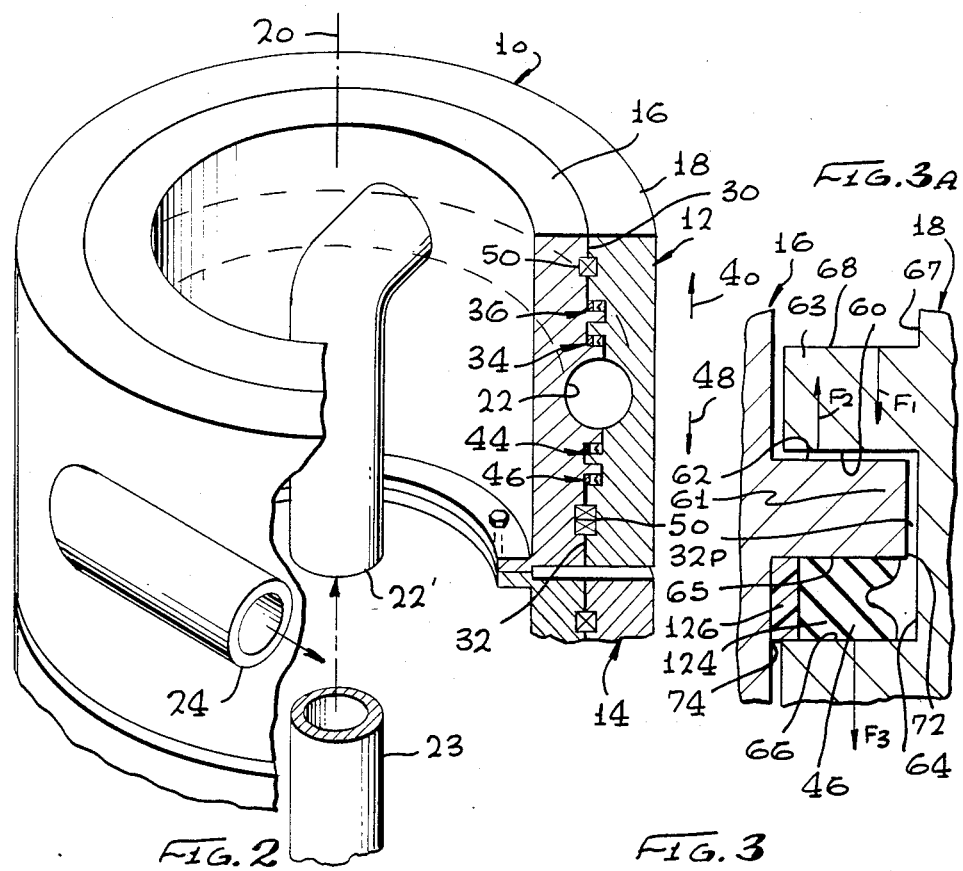

HIGH PRESSURE FLUID SWIVEL

BACKGROUND OF THE INVENTION

Fluid swivels are commonly used in offshore installations to transfer fluids such as gas and oil between a fixed underwater pipeline, or underwater hydrocarbon well and a tanker that may be moored to a buoy around which it drifts under the influence of currents, winds, and waves. The fluid swivel, which may be located on a buoy to which the tanker is moored, may have to withstand high pressures, as where an undersea well produces hydrocarbons at high pressures. A typical multi-product fluid swivel includes a ring-shaped outer wall that rotates about a relatively fixed inner wall, with the walls forming a chamber between them through which fluid passes. There is a gap between the inner and outer walls leading in opposite directions from the chamber, and the gap must be sealed. A fluid swivel with a diameter at the middle of the chamber of at least about four feet is required, to provide room within the chamber for pipes leading to the inner wall and to facilitate rotation, where large volume flow rates are required.

Prior art swivels have used radial seals to seal the gap between the inner and outer walls, each seal having one side pressing radially outwardly against the outer wall and another side pressing radially inwardly against the inner wall. The life of the seal depends upon changes in the width of the gap across which it seals. When high pressure fluid enters the chamber, the large radial forces on the outer and inner walls cause the outer wall to expand and the inner wall to contract radially. As a result, the width of the gap across which the seal extends increases when the high pressure is applied. For very high pressures, the inner and outer walls must be made massive to avoid large increases in the width of the gap. Despite demand for reliable fluid swivels of at least about four feet diameter (for high volume flow) and capable of passing fluids at over 2000 psi, no manufacturer known to applicant has been able to supply such fluid swivels.

At least two seals are generally used along each side of the gap extending from the fluid-carrying chamber to the environment. One seal serves as the primary seal which generally withstands the pressure, while the other seal is a secondary or back-up seal which prevents leakage of hydrocarbons into the environment in the event of failure of the primary seal. However, if a primary seal on one side of the fluid-carrying chamber should fail, while the primary seal on the other side of the chamber remains intact, then unbalanced pressures could occur, such unbalanced loads could impose large axial loads on the bearings which rotatably couple the inner and outer walls of the swivel, and consequently increase the turning torque of the structure.

The "fatigue life" of a seal is inversely proportional to an exponential function of the width of the extrusion gap and the pressure across the seal. As a result, at very high pressures the life of the seals may be very short. A fluid swivel which has a lighter weight and whose seals had an increase life, especially in the case of swivels carrying high pressures, and which avoided axial unbalances in the event of failure of a primary seal, would be of considerable value.

SUMMARY OF THE INVENTION

In accordance with one embodiment of the present invention, a fluid swivel is provided which can carry fluid at high pressures while maintaining long seal life. The fluid swivel includes an outer wall rotatable about an inner wall and forming a fluid-carrying chamber between them. The gap between the walls is sealed by face seals. In one fluid swivel which includes primary and secondary face seals on either side of the fluid-carrying chamber, the portion of the gap lying between the seals includes a passage-portion surface on the outer wall which faces radially inwardly. The passage-portion surface on the outer wall which faces radially, and the surface on the outer wall which faces the secondary seal, face in opposite axial directions. As a result, if the primary seal fails, so that pressure is applied to the outer wall, both at the secondary seal and along the passage portion, the forces along the passage portion and at the secondary seal will cancel out one another to avoid introducing a high axial load on the bearings that rotatably support the outer wall on the inner wall.

The life of the primary seal can be extended by applying half the pressure in the chamber to the secondary seal, so that only half the pressure in the chamber is applied across either seal.

The portion of the gap extending away from each seal towards the environment, extends first in a radial direction and then in an axial direction. As a result, when the outer wall expands slightly in diameter as a result of high pressure being applied to the chamber, the gap immediately downstream of the low pressure end of the seal (the extrusion gap) does not widen significantly, so material of the seal assembly is not extruded into a widening gap.

The novel features of the invention are set forth with particularity in the appended claims. The invention will be best understood from the following description when read in connjunction with the accompanying drawings.

BRIEF DESCRIPTION OF THE DRAWINGS

FIG. 1 is a partial perspective and sectional view of a multi-path fluid swivel constructed in accordance with the present invention.

FIG. 2 is a sectional view of a fluid swivel in accordance with an early design, of applicant showing a disadvantage thereof.

FIG. 3 is a sectional view showing a portion of the fluid swivel of FIG. 1.

FIG. 3A is a view of a portion of the fluid swivel of FIG. 3.

DESCRIPTION OF THE PREFERRED EMBODIMENTS

Figure 4:
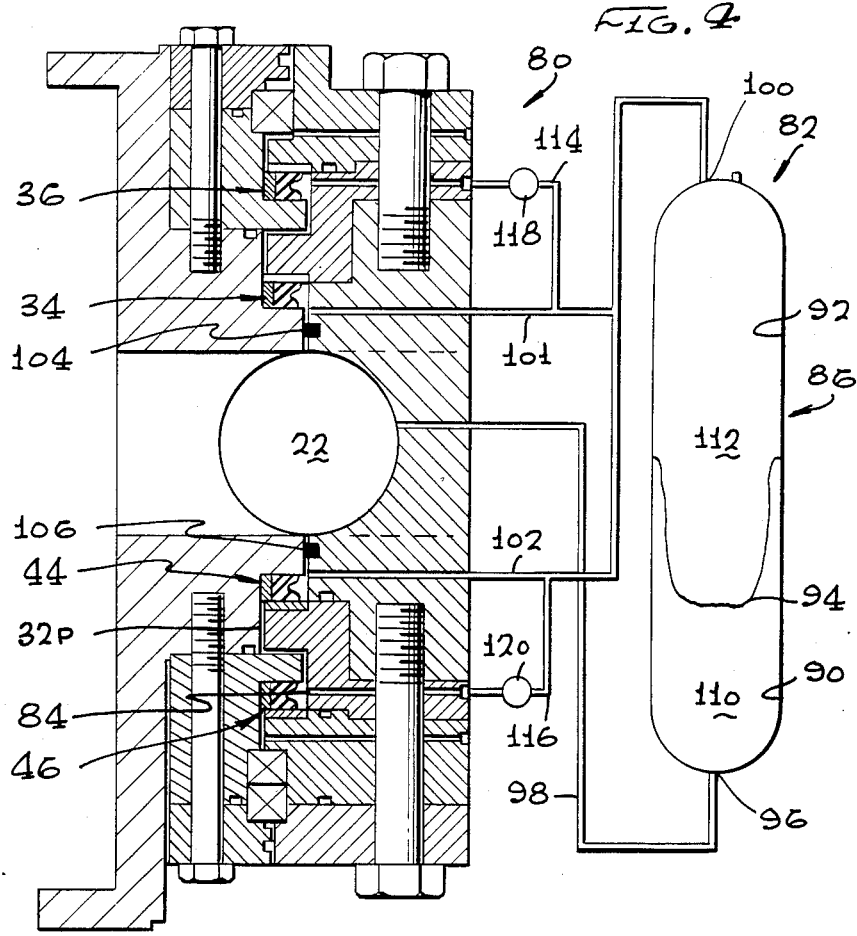
FIG. 4 is a more detailed sectional view of a fluid swivel constructed in accordance with another embodiment of the invention.

FIG. 1 illustrates a multi-path fluid swivel 10, which may be considered as including several independent fluid swivels such as 12 and 14. The fluid swivel 12 includes an outer wall 18 which rotates about an inner wall 16 around an axis 20. The walls form a fluid-carrying chamber 22 between them. Fluid enters the chamber through a relatively stationary inlet pipeline 22' that may receive fluid at a high pressure of over 2000 psi, and at a high flow rate from an undersea well pipe 23. Fluid in the chamber exits through an outlet pipeline 24 that can rotate about the axis 20. The fluid swivel forms two gaps or gap passages 30, 32 which extend from opposite sides of the chamber, and which extend to the environment in the case of the swivel in FIG. 1, or to another fluid-carrying chamber which may be at a different pressure than the chamber 22 in other swivel designs. A pair of seal assemblies 34, 36 lie along the gap passage 30 that extends in one axial direction 40 from the chamber 22, and another pair of seal assemblies 44, 46 extend along the other gap passage 32 which extends in the opposite axial direction 48. Each pair of seal assemblies includes a primary seal assembly 34 or 44 which is closest to the chamber, and a secondary seal assembly 36, 46 which is furthest from the chamber. The secondary seal assembly is often used as a back-up seal that prevents leakage of fluid from the chamber into the environment in the event of failure of the primary seal. Bearings 50 rotatably support the outer wall 18 in rotation relative to the inner wall about the axis 20. It may be noted that some of the drawing figures such as FIGS. 1-3 are simplified; for example, while each wall 16, 18 is shown in FIGS. 1-3 as formed of a single element, such walls are generally constructed of several rings to facilitate assembly and disassembly, one construction being shown in applicant's FIG. 4.

FIG. 2 illustrates a fluid swivel 52 of an early design of applicant which has important advantages over the prior art but which has disadvantages that applicant has avoided. The fluid swivel 52 includes two face seal assemblies or seals 34a, 36a and 44a, 46a along each gap passage 30a, 32a. The use of axial or face seals such as 34a has an advantage when high pressure (above 2000 psi) is applied to a fluid-carrying chamber 22a of large diameter, of more than abut four feet, which results in radial loads over one-half million pounds for a chamber of six inch width. These high radial loads cause the outer wall to expand in the outer radial direction 54a, and the inner wall to contract in the direction of 54b. However, the increase in the width of the gap passages 30a, 32a does not increase the gap dimension across which the seal assembly must seal. For a radial seal of the prior art, movement of the outer wall 18a away from the inner wall 16a would result in the need for the seal to cross a wider gap. Expansion of the gap across which the seal extends is disadvantageous, because the life of a seal is limited to a large extent by changes in the width of the gap across which the seal must provide sealing. The larger the change in width, the more easily the softer seal material can extrude through it and then break, thus reducing the life of the seal.

The fluid swivel 52 has a disadvantage in that if the primary seal 44a should fail, the fluid swivel would become unbalanced and apply large axial forces to the bearings 50a. When the primary seals 34a, 44a are both functioning, then each applies a pressure or force $P_4$ and $P_1$ to the outer wall 18a. Since the two forces $P_4$ and $P_1$ are equal and in opposite axial direction 40, 48, these forces cancel one another. As a result, the only significant axial forces on the bearings 50a results from the weight of the outer wall 18a. However, if one of the primary seals 44a or 34a fails, then high pressure fluid will be passed to the secondary seal 46a, which will then apply a pressure $P_2$ to the outer wall 18a. The forces $P_1$ and $P_2$ are approximately equal, so they cancel out one another and there is substantially zero force applied to the lower half of the outer wall 18a. However, the upper part of the outer wall is still exposed to the pressure $P_4$ from the upper primary seal 34a which has not failed. As a result, the outer wall 18a will be subjected to an upward force $P_4$ which will apply a large axial force in the direction 40 to the bearings 50a.

In one example, the radial width S of each seal is about two inches, the diameter of the fluid swivel at the center of the chamber 22a is about six feet, and the pressure in the chamber is two thousand psi. In that case the force $P_1$ equals about 880,000 pounds. Such a large force on the outer wall 18a heavily loads the bearings 50a, which can result in great resistance to turning of the outer wall 18a. It is important that the fluid swivel continue to operate in a substantially normal manner for a short period after failure of a primary seal, until the system can be shut down and the primary seal can be replaced.

FIGS. 3 and 3A illustrate additional details of the fluid swivel 12 of the present invention, which has the advantages of a face or axial seal, and which also avoids large loading of the bearings 50 in the event of failure of a primary seal. Each gap passage such as 32 includes a passage portion 32P which extends between the primary and secondary seal assemblies or seals 44, 46 which lie along the gap passage. The passage portion 32P forms a pair of largely radially-extending wall surfaces 60, 62, one surface 60 being part of the outer wall 18 and the other 62 being part of the inner wall 16. Both surfaces face in an axial direction, with the surface 60 on the outer wall facing in a first or downward axial direction 48. The secondary seal 46 lies in a region 64 (FIG. 3A) which includes two axially-facing surfaces, including an outer wall axial surface 66. The primary seal lies in another region 67. Each region has high and low pressure ends such as 72, 74 that are radially spaced.

When the primary seal 44 is functioning, the pressure within the chamber 22 presses against an outer wall surface 68 in a second or downward direction 48. This force $F_1$ in a downward direction at the primary seal 44, is balanced by an upward force $F_4$ at the other primary seal 34. If the primary seal 44 should fail, pressured fluid will flow through the gap portion 32P and apply pressure to both of the outer wall surfaces 60 and 66. The force $F_2$ on one outer wall surface 60 is in an upward or first direction, and the force $F_3$ on the other outer wall surface 66 is in a downward direction. These forces $F_2$ and $F_3$ are substantially equal and opposite so they cancel one another, leaving a net force $F_1$ at the primary seal 44 to push down on the outer wall along the lower gap passage 32. As mentioned above, the downward force at the lower primary seal 44 is counterbalanced by the upward force $F_4$ at the other primary seal 34. Thus, even in the event of failure of one of the primary seals 34 or 44, the axial forces on the outer wall 18 will be substantially balanced, to avoid heavy axial loading on the bearings 50.

Figure 5:
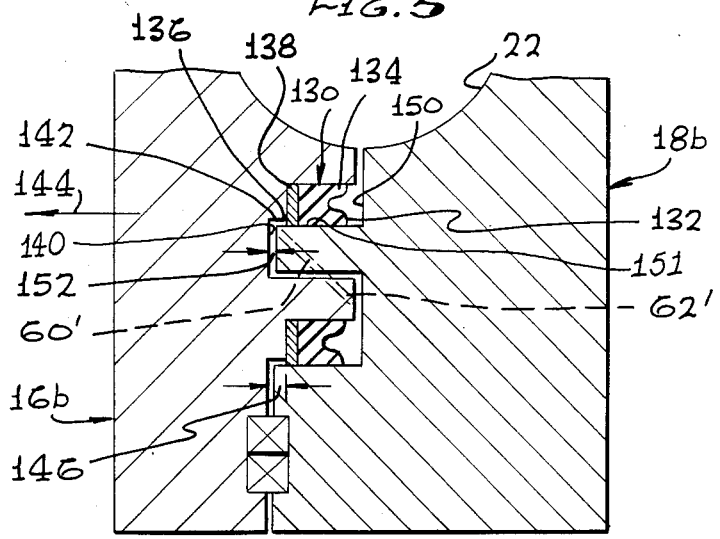
FIG. 5 is a partial sectional view of a fluid swivel constructed in accordance with another embodiment of the invention.

The axially-extending surfaces 60, 62 are formed on protrusions such as 61,63 of the outer and inner walls that lie between the primary and secondary seals. The axially-extending surfaces can be constructed to extend at an angle to the radial direction. FIG. 5 shows surfaces 60', 62' which extend only partially radially. In any case, the radial distance along the surfaces 60, 62 should be equal to the radial surfaces 66 and 65 respectively, at the secondary seal.

When very high pressures, such as five thousand psi to ten thousand psi are applied to the chamber 22, the life of the primary seals is greatly reduced. Applicant can increase the life of the seals by distributing the total pressure across the plurality of seals. FIG. 4 illustrates a fluid swivel 80 which is largely similar to that of FIG. 3, except that FIG. 4 shows the swivel in greater detail and also shows a manner in which pressure across any seal is reduced. A pressure source 82 is coupled to a location 84 along the gap passage portion 32P which lies between the primary and secondary seal assemblies 44, 46. The pressure source 82 applies a pressure to the location 84 which is about one half the pressure in the chamber 22. Thus, if the pressure in the chamber 22 is six thousand psi, then the pressure source applies a pressure of about three thousand psi at the location 84. As a result, the pressures on opposite sides of the primary seal 44 are six thousand psi and three thousand psi, respectively, so the primary seal 44 has to withstand a pressure difference of only three thousand psi. Of course, the secondary seal 46 must also withstand the pressure of about three thousand psi. The reduction in pressure across each seal results in a much greater lifetime for the fluid swivel. When it is considered necessary, a tertiary seal can be provided along the gap passage further from the chamber than the secondary seal, as a back-up in the event the secondary seal fails.

The pressure source 82 includes a container 86 which includes two fluid resevoirs 90, 92 separated by a diaphragm separator 94. One end 96 of the container is connected by a conduit 98 to the fluid-carrying chamber 22, to maintain the pressure in the reservoir 90 substantially equal to the pressure in the chamber 22. The opposite end 100 of the container is connected by conduits 101, 102 to the primary seals 34, 44. The primary seals are largely isolated from the chamber 22 by a pair of isolation seals 104, 106. While the reservoir 90 contains the same material 110 as in the chamber 22, the other reservoir 92 contains a clean fluid 112. The clean fluid 112 is devoid of sand and other particles which could harm a seal, is compatible with the seal material, and is not harmful to the environment if it should leak out. Thus, the primary seals 101,102 encounter clean fluid even on their high pressure sides.

The pressure across each primary seal such as 34 is minimized by the provision of a conduit 114, 116 and a valve 118, 120 which applies fluid to the secondary seals 36, 46 which is about one half of the pressure applied to the primary seals and which is also about one half the pressure in the chamber 22. Valves 118, 120 located along the conduits 114, 116, are set to open at about one half the pressure in the chamber 22. Each valve has an outlet connected to a location such as 84 and an inlet at chamber pressure. Thus, if the chamber 22 carries fluid at six thousand psi, the valves are set to open at a pressure of about three thousand psi. Valves are available which can open at a predetermined fraction of a sensing pressure, the sensing pressure equaling the pressure in the chamber 22. Reducing the pressure across the primary seal 34 or 44 greatly lengthens its lifetime, especially where very high pressures are encountered.

Each seal assembly or seal such as 34 in FIG. 3, includes an elastomeric seal member 124 and a harder elastomeric seal ring 126. The seal member 124 expands when pressure is applied to one end of it, to prevent the passage of fluid. The seal ring 126 serves to backup the seal member and prevent its extrusion into the gap portion 30P which lies immediately downstream therefrom. The seal ring 126 can resist extrusion into the gap portion 30P when the gap portion has a narrow thickness, but the possibility of extrusion increases as the gap thickness increases. The gap dimension increases when high pressure fluid is applied to the chamber 22 which tends to separate the inner and outer walls 16, 18. Applicant avoids large increases in the gap width immediately downstream from a seal ring, and makes the seal independent of changes in radial gap width, by the construction shown in FIG. 5.

FIG. 5 shows a seal assembly 130 with a high pressure side 132 at the seal member 134, and a low pressure side (extrusion side) 136 at the seal ring 138. The gap 140 extending from one side of the chamber 22 includes an outlet portion 142 which lies at the extrusion side 136 of the seal assembly. To avoid extrusion of the face seal assembly, applicant constructs the length of passage or outlet portion 142 so it extends in a radial direction 144 along a distance 146 away from the hollow annular region 150 which holds the seal assembly and away from the extrusion side 136 of the seal assembly. The distance 146 is at least about equal to the sum of maximum deflections of the outer and inner walls 18b, 16b away from each other when fluid filling the chamber 22 is at the highest operating pressure of the fluid swivel. It can be seen in FIG. 5 that one side 151 of the outlet portion 142 is a radial extension of one of the radially-extending walls 151 of the seal holding region where the seal assembly 130 is located. The radial dimension 152 of the gap for a six foot diameter fluid swivel operating at about six thousand psi may increase from a clearance of eight thousandths inch to a clearance plus deflection of perhaps fifty thousandths inch, with the actual amount dependent upon the thickness of metal of the fluid swivel. Thus, extrusion of the face seal assembly caused by separation of the outer and inner walls of the fluid assembly, is avoided by providing a radially-extending outlet portion of the gap passage on the extrusion side of the seal. The isolation of the seal from increases in radial gap width, permits the walls of the fluid swivel to be made thinner, with the thickness of the walls determined by the strength of the walls required to withstand the high pressures rather than to avoid more than small deflections.

Thus, applicant can increase the lifetime of service of the seals of a high pressure fluid swivel. The swivel is constructed so that face seals are used, instead of radial seals, so the gap width across which the seals extend does not change considerably as pressure in the fluid-carrying chamber increases. A change in axial loading of the fluid swivel bearings in the event of failure of a primary seal, is avoided by forming the gap passage which connects the primary and secondary seal so there is a radially-extending portion to form a surface on the outer wall which faces in an opposite direction to the outer wall surface which faces the secondary seal. A high pressure in the fluid-carrying chamber can be distributed among the primary and secondary seals. Extrusion of the low pressure side of a seal into the gap passsge, which could occur when the inner and outer walls separate under high pressure, is avoided by providing a radially-extending gap outlet portion extending from a low pressure or extrusion side of a seal assembly.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid swivel for passing fluid from a hydrocarbon well which is at a pressure of over 2000 psi, comprising:

ring-like inner and outer walls that form a fluid-carrying largely ring-shaped chamber between them which has a ring diameter of at least four feet, and forming a pair of gap passages between said inner and outer walls, said gap passages extending from said chamber to locations at opposite sides of the chamber;

bearing means which rotatably couple the inner and outer walls during rotation of the outer wall with respect to the inner one about a predetermined axis;

at least one seal along each of said gap passages for blocking the flow of fluid therealong, with at least a portion of the pressure of fluid in the chamber applied across the seal;

a pipe coupled to a first of said walls and leading to said chamber to pass fluid at a pressure of over 2000 psi through said chamber, whereby to apply forces to said chamber which significantly expand the outer wall and compress the inner wall to increase the gap width between them;

said passages having seal holding regions with high and low pressure ends that are radially spaced with respect to said axis, and forming two radially-extending surfaces on axially opposite sides of the region, one surface on the inner wall and one surface on the outer wall, each seal lying in one of said regions and each seal sealing against the two radially-extending surfaces in the corresponding region in which the seal lies.

2. In a fluid swivel which includes ring-like inner and outer walls that form a fluid-carrying chamber between said inner wall and outer walls, and a pair of gap passages that lead from opposite sides of the chamber, bearing means which rotatably couple the walls during rotation of the outer wall with respect to the inner one about a predetermined axis, and a seal assembly along each gap passage, each seal assembly including a primary seal closest to the chamber and a secondary seal further from the chamber than the primary seal, the improvement wherein:

a first of said gap passages includes a passage portion extending between the primary and secondary seals which lie therealong, the passage portion forming a pair of primarily radially-extending wall surfaces, one at the outer wall and one at the inner wall, the radially-extending wall surface at the outer wall at said passage portion facing at least partially in a first axial direction, and the outer wall at said secondary seal against which said secondary seal seals facing at least partially in a second axial direction which is opposite said first axial direction, whereby to minimize any change in axial load on said bearing means in the event that the primary seal fails.

3. The improvement described in claim 2 wherein:

said first gap passage forms first and second seal-containing regions at opposite ends of said gap portion, said inner and outer walls having primarily axially-facing surfaces at each of said regions;

said outer wall having a radially extending inward protrusion lying directly between said regions, said inward protrusion having one axially-facing surface facing in a first axial direction and which forms a wall of said first seal-containing region, said outer wall protrusion having a second axially-facing surface lying about halfway between said regions and facing in a second axial direction opposite to said first axial direction, and said inner wall having a radially extending outward protrusion lying between said first protrusion and said second region and which forms a wall of said second region.

4. The improvement described in claim 2 wherein:

said passage portion includes a length of passage extending directly from said primary seal, said passaage length extending in a radial direction away from said primary seal and away from said chamber, whereby to avoid extrusion of seal material into said length of passage if the inner and outer walls separate when high pressure fluid enters the chamber.

5. A fluid swivel for passing fluid comprising:

ring-like inner and outer walls that form, between them, a largely ring-shaped chamber with opposite sides, said walls also forming a pair of gap passages between said inner and outer walls, said gap passages extending from said chamber to locations at said opposite sides of the chamber;

bearing means which rotatably couple the inner and outer walls during rotation of the outer wall with respect to the inner one about a predetermined axis;

a pair of seals along each of said gap passages for blocking the flow of fluid therealong;

a pipe coupled to a first of said walls and leading to said chamber to pass fluid through said chamber, whereby to apply forces to said chamber which significantly expand the outer wall and compress the inner wall to increase the gap width between them;

said passages having seal holding regions with high and low pressure ends that are radially spaced with respect to said axis, and forming two radially-extending surfaces on axially opposite sides of the region, one surface on the inner wall and one surface on the outer wall, each seal lying in one of said regions and each seal sealing against the two radially-extending surfaces in the corresponding region in which the seal lies.

the pair of seals along each gap passage includes a primary seal and a secondary seal spaced along the gap passage with the primary seal closest to the chamber, each gap passage including two seal against which said second seal seals holding regions including said first named region, with each seal lying in one of said regions;

each gap passage including a passage portion extending between the primary and secondary seals which lie therealong, the passage portions forming a pair of primarily radially-extending wall surfaces, one on the outer wall and one on the inner wall, the radially-extending wall surface on the outer wall at said passage portion facing in a first axial direction, and the outer wall at said secondary seal facing in a second axial direction, whereby to minimize any change in axial load on said bearing means in the event that the primary seal fails.

6. In a fluid swivel which includes inner and outer walls that form an annular largely ring-shaped chamber between said lower and outer walls and which form first and second gap passages extending from opposite sides of the chamber, the outer wall rotatable about a predetermined axis with respect to the inner wall, and primary and secondary seal assemblies located along each gap passage, the primary seal assembly lying closer to the chamber than the secondary seal assembly, the improvement comprising:

means coupled to said chamber for applying a fraction of fluid pressure in said chamber to a location along said first gap passage which is between said first and second seals, whereby to reduce pressure across the primary seal when fluid lies in said chamber at a pressure exceeding a predetermined pressure;

said means for applying includes a container, a separator moveable within the container, first and second resesrvoirs on opposite sides of said separator, and a quantity of clean fluid lying in said first reservoir;

said second reservoir connected to said chamber to receive fluid from said chamber, adn said first reservoir coupled to a second location along said first gap passage which lies between said chamber and said primary seal; and said means for applying includes a conduit coupling said chamber to said second location and a valve which lies along said conduit and which opens at a pressure of about half the chamber pressure.

7. In a fluid swivel which includes inner and outer walls that form an annular largely ring-shaped chamber between said inner and outer walls and which form first and second gap passages extending from opposite sides of the chamber, the outer wall rotatable about a predetermined axis with respect to the inner wall, and primary and secondary seal assemblies located along each gap passage, the primary seal assembly lying closer to the chamber than the secondary seal assembly, the improvement comprising:

means coupled to said chamber for applying a fraction of fluid pressure in said chamber to a location along said first gap passage which is between said first and second seals, whereby to reduce pressure across the primary seal when fluid lies in said chamber is a pressure exceeding a predetermined pressure;

said means for applying a fraction of the fluid pressure includes a valve having an outlet connected to said second location and an inlet and means for applying the chamber pressure to the inlet of the valve, said valve constructed to open at about half the maximum expected pressure in the chamber.

8. A fluid swivel for passing fluid comprising:

ring-like inner and outer walls that form a largely ring-shaped chamber between them, and that form a pair of gap passages between said inner and outer walls said gap passages extending away from said chamber from location at opposite sides of the chamber;

bearing means which rotatably couple the inner and outer walls during rotation of the outer wall with respect to the inner one about a predetermined axis;

at least one seal along each of said gap passages for blocking the flow of fluid therealong;

a pipe coupled to a first of said walls and leading to said chamber to pass fluid through said chamber;

said passages having seal holding regions with high and low pressure ends that are radially spaced with respect to said axis, and forming radially-extending surfaces on axially opposite sides of the regions, one surface on the inner wall and one surface on the outer wall, each seal lying in one of said regions and each seal sealing against the two radially-extending surfaces in the corresponding region in which the seal lies.

each gap passage includes an outlet portion formed between said inner and outer walls and extending in a generally radial direction directly away from the corresponding seal holding region at a location thereof which is furthest from said chamber along the gap passage, one side of said outlet portion being formed by a radial extension of one of said radially-extending surfaces.

* * * * *